May 9, 1961  J. P. HULT  2,983,327
PARKING DEVICE
Filed April 20, 1960  2 Sheets-Sheet 1

INVENTOR.
JULIUS P. HULT
BY
Kimmel & Crowell
ATTORNEY

May 9, 1961  J. P. HULT  2,983,327
PARKING DEVICE
Filed April 20, 1960  2 Sheets-Sheet 2

INVENTOR.
JULIUS P. HULT
BY
Kimmel & Crowell
ATTORNEYS

United States Patent Office 2,983,327
Patented May 9, 1961

2,983,327

PARKING DEVICE

Julius P. Hult, 202 Beacon Drive, Eugene, Oreg.

Filed Apr. 20, 1960, Ser. No. 23,483

2 Claims. (Cl. 180—1)

This invention relates to a parking device and more particularly to a device adapted for parking of motor vehicles and the like.

A primary object of this invention is the provision of an attachment for a motor vehicle adapted to raise the rear axle assembly including the rear wheels above the road surface, and then move the rear of the vehicle laterally in either one direction or the other towards or away from the curb by means of a self-contained power unit.

An additional object of the invention is the provision of a device of this character whereby a vehicle may be parked merely by steering the front end of the vehicle diagonally towards the curb, and then actuating the parking device to swing the rear end laterally toward the curb.

Still another object of the invention is the provision of a device of this character which provides a means whereby a vehicle may be parked in a very limited space with a minimum of effort and difficulty.

A still further object of the invention is the provision of a device of this character which may be readily adjusted for different ground clearance as desired.

An additional object of the invention is the provision of a device of this character which will facilitate parking for drivers with certain types of physical disability.

Still other objects reside in the combinations of elements, arrangements of parts, and features of construction, all as will be more fully pointed out hereinafter and disclosed in the accompanying drawings wherein there is shown a preferred embodiment of this inventive concept.

In the drawings.

Similar reference characters refer to similar parts throughout the several views of the drawing.

Figure 1:
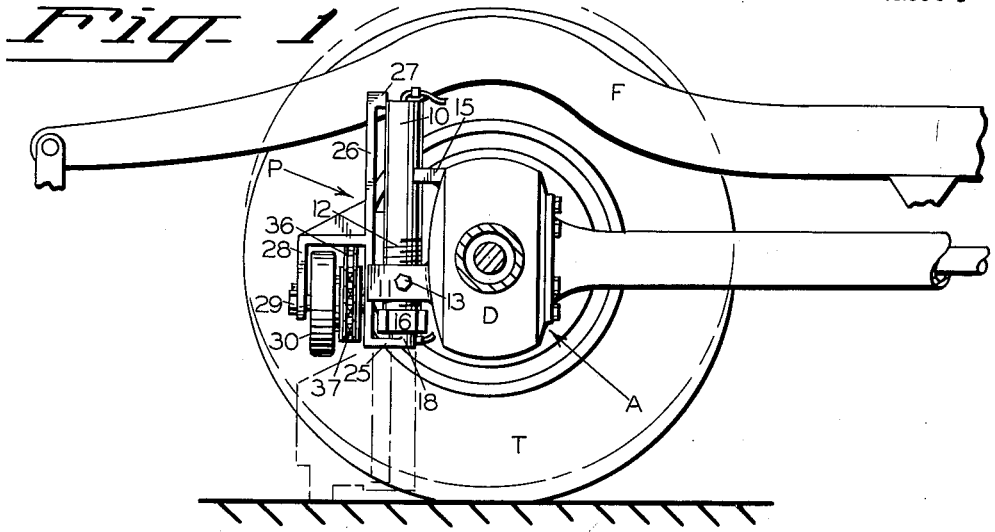
Figure 1 is a fragmentary view partially in section and partially in elevation showing the device in the instant invention as attached to the differential of a motor vehicle.

Having reference now to the drawings in detail, there is generally indicated at F a portion of a vehicle frame, provided with a rear axle assembly, indicated at A, having the customary tire and wheel assembly T. A conventional differential housing is designated at D, and to this housing is adapted to be attached the parking unit of the instant invention, generally indicated at P.

Parking unit P consists of a hydraulic cylinder 10, which is threaded into a boss 11 by threads 12. Boss 11 is integral with the differential housing D. Threaded into boss 11 is a locking bolt 13 provided with a lock nut 14. Located at the top of differential housing D is a guide member 15 which is also fixedly secured to differential housing D. Located at the bottom of cylinder 10 and threaded thereto by threads 12 is a packing nut 16 with its packing material indicated as 17, as shown in Figure 3.

Figure 3:
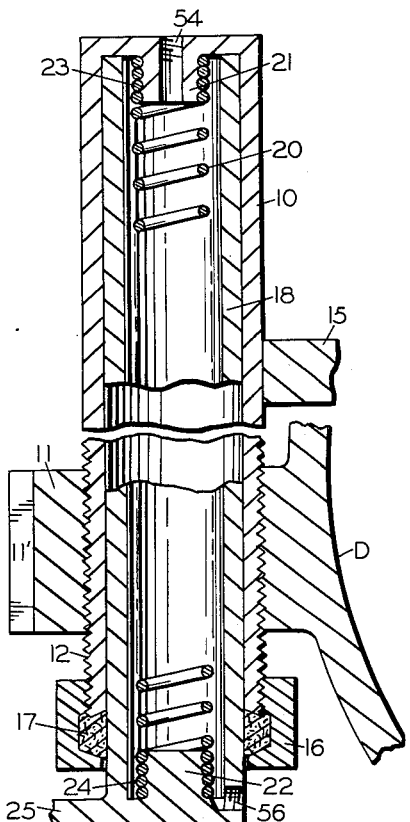
Figure 3 is an enlarged vertical longitudinal sectional view taken through the operating cylinder of the device.

A hollow piston 18 operates in the cylinder 10 and is held in retracted or inoperative position by a spring 20, the ends 23 and 24 of which are screwed upon threaded bosses 21 and 22, respectively, as shown in Figure 3.

Formed at the bottom of piston 18 and extending rearwardly, is a flat bar 25 from which projects between a pair of ears 11' carried by boss 11 and extends upwardly a flat bar member 26, which terminates at its top with a sliding shoe 27. Extending rearwardly from the member 26 is a rear wheel supporting member 28 which has a bolt 29 journalled within the member 28. Bolt 29 extends through a drive wheel 30 and its associated sprocket 37, and at its forward end has a reduced threaded portion 29'. Threaded portion 29' is tapped into the lower end of flat bar 26.

Figure 2:
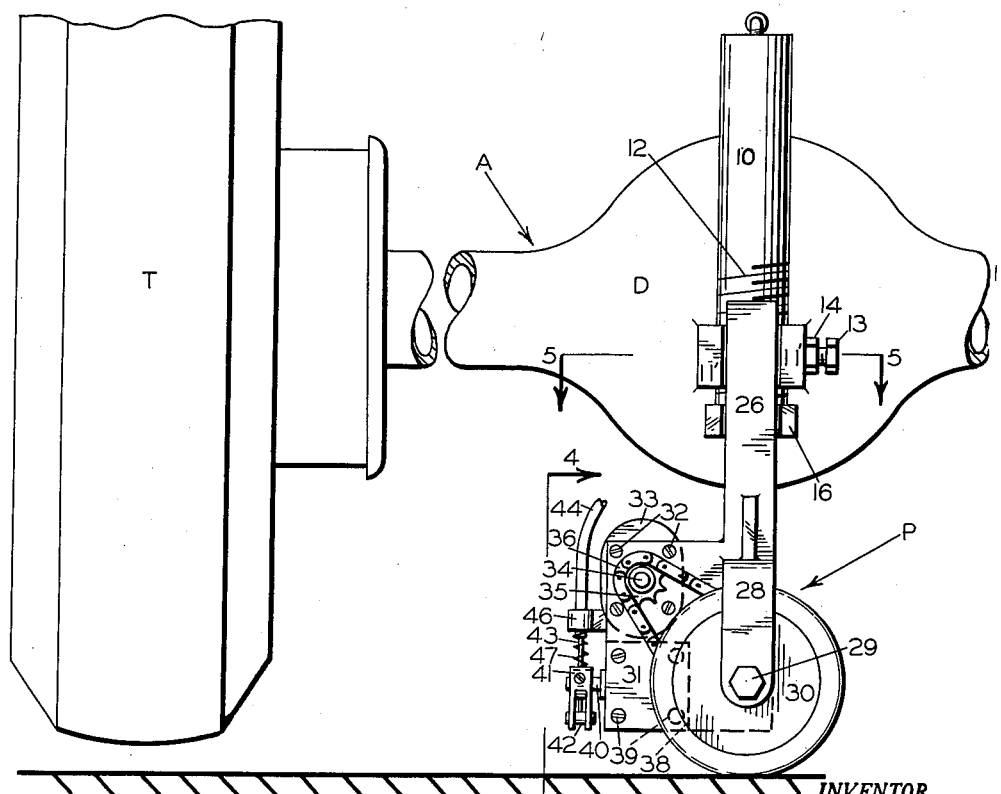
Figure 2 is an enlarged fragmentary rear view of the apparatus of Fig. 1 shown in lower or operating position.

Extending to the left of member 26, as viewed in Figure 2, and forming part thereof, is a mounting plate 31 to which is secured a hydraulic drive motor 33 by means of screws 32. A drive shaft 34 has a drive sprocket 35 keyed thereto which drives the chain 36. Chain 36 is trained about sprocket 37 which is secured to the wheel 30.

Figure 4:
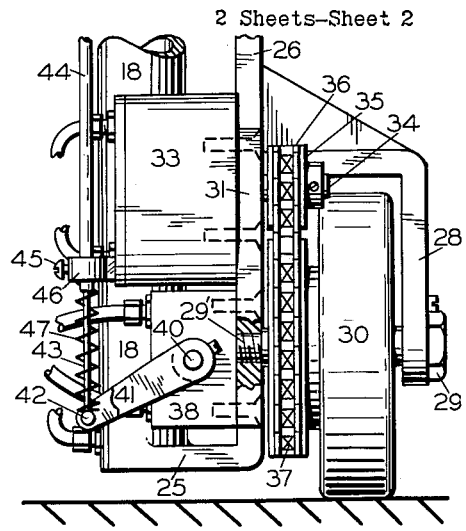
Figure 4 is an enlarged side elevational view taken substantially along the line 4—4 of Fig. 2 as viewed in the direction indicated by the arrows.
Figure 5:
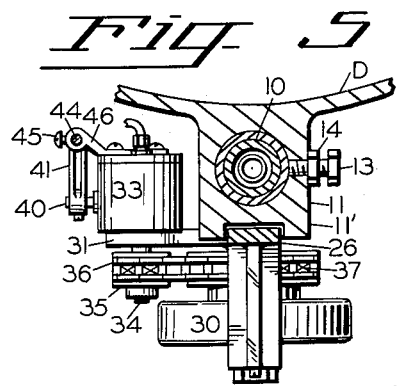
Figure 5 is a fragmentary sectional view taken substantially along the line 5—5 of Fig. 2 as viewed in the direction indicated by the arrows.

Also secured to the mounting plate 31 is a four-way hydraulic selector valve 38 by means of mounting screws 39. A valve operating shaft 40 has secured thereto a forked lever 41 on the end of which is rotatably secured a cable ferrule 42, which has anchored to it by any usual means, a control cable 43. This cable operates within a housing 44 which is secured by a screw 45 threaded into an anchoring member 46, which in turn is fixedly secured to the motor 33, as best shown in Figs. 2, 4 and 5. A compression spring 47 biases lever 41 to the position of Fig. 4.

The hydraulic power for this parking unit is obtained from an existing power steering unit as is supplied in present vehicles. An independent hydraulic power source could be built in, but it is more likely that the existing power source would be used as before described. The existing hydraulic pump 48 (see Fig. 6) with its associated reservoir 49 is actuated by the usual means (not shown) which normally would supply hydraulic means for operating a power steering unit through a pipe 62.

Figure 6:
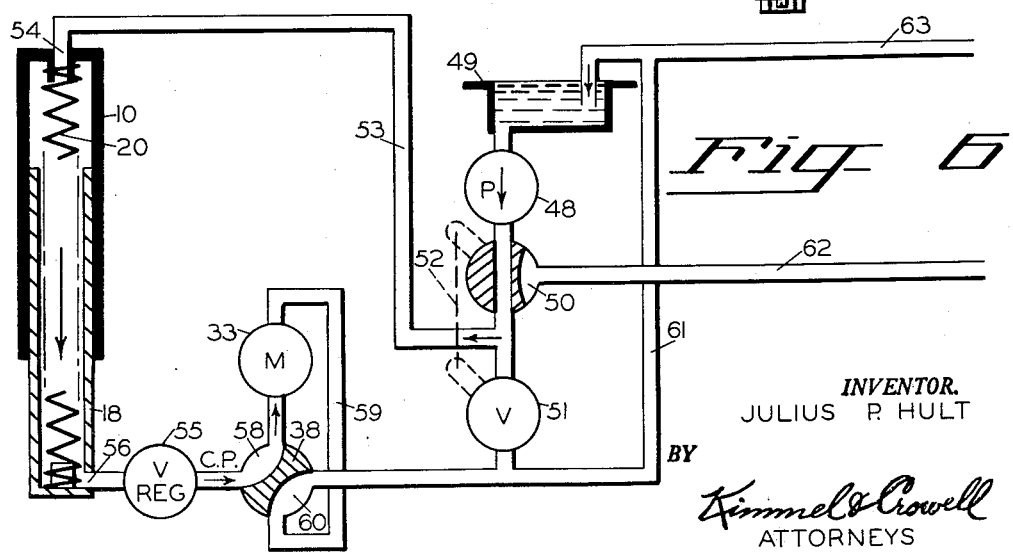
Figure 6 is a diagrammatic view showing the hydraulic system for operating the parking device.

The vehicle utilizing the parking device is steered diagonally into a tandem type parking space until the front wheel is in close proximity or touching the curb. A lever suitably mounted within the vehicle (not shown) is connected to a three-way valve 50 which in turn operates valve 51 through a link 52. When valve 50 is moved into the parking position, as shown in Fig. 6, valve 51 is closed. Valve 50 allows fluid to enter a pipe 53 in the direction of the arrow into a port 54 located at the top of cylinder 10. The fluid is forced into the cylinder 10 at a rate greater than a regulating valve 55 will allow it to escape. This restrictive action caused by valve 55 causes the fluid to force piston 18 downwardly. A small amount of fluid passes through a port 56, regulator valve 55, and into motor 33 but has no function at this stage of travel. Piston 18 continues its downward travel until the bottom surface of the sliding shoe member 27 contacts the top surface of the boss 11, limiting the travel of the piston 18 and its associated drive wheel 30. The contacting of the shoe member 27 with the top surface of the boss 11 serves as a brake means operatively connected to the piston 18 for stopping the downward or extended movement of the piston 18. In this position the rear tires T of the vehicle are raised slightly from the street surface. When this travel limit is reached, fluid is forced into a chamber 58 of valve 38 through motor 33 returning by way of a pipe 59, a valve chamber 60, and a pipe 61 to the reservoir 49. Motor 33 now turns the drive wheel 30 which in turn moves the rear of the vehicle into the parking space and causes said vehicle to assume a parallel position along the curbing.

Valve 38 is then moved to its neutral position. The vehicle may or may not be lowered at this time; however, it is apparent from the foregoing how this is accomplished.

When it is desired to move out of the parking space, a second lever (not shown), suitably mounted within the vehicle, is actuated. This lever is connected by way of the cable 43 and lever 41 to the valve 38. When valve 38 is moved to its opposite position from that shown, it will reverse the fluid flow through the motor 33 causing the vehicle to move outwardly from the curbing until suitable angularity is obtained for clearance of any vehicle that is parked in the rear. When this position of the vehicle is reached valve 38 is moved to its neutral position. The aforementioned lever, connected to valves 50 and 51, is then moved to a new position, which causes valves 51 and 50 to open to allow the fluid to enter the power steering supply pipe 62, and return by way of a line 63. The fluid within cylinder 10, and hence piston 18, is then forced by the weight of the vehicle and subsequently the action of spring 20 forcing the fluid to enter port 54, pipe 53, valve 51 and pipe 61, returning to reservoir 49.

To adjust the device for different ground clearance, lock nut 14 is loosened allowing the bolt 13 to be unscrewed slightly. This allows the threaded portion 12 of the cylinder 10 to be rotated up or down within the threaded boss 11. When the desired setting is reached, locking nut 14 is again used to anchor the cylinder 10. The support member 15 is used for additional supporting means for the cylinder 10.

Obviously, the device may be employed, if desired, as a jack to hold the end of the vehicle off the ground for any desired purpose, as for example, the changing of a tire or tires.

From the foregoing it will now be seen that there is herein provided an improved parking device which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a car parking device having a power steering system including a fluid pump having an intake and a discharge, a rear axle, and a differential housing carried by the rear axle, a boss formed integrally with said housing, a vertically disposed hydraulic cylinder carried by said boss, conduit means connecting said pump discharge to said cylinder, a piston working in said cylinder between extended and retracted positions and having a portion adjacent the lower end exteriorly of said cylinder, brake means operatively connected to said piston limiting the extended movement of said piston, a bar member carried by said piston lower end portion, an auxiliary wheel mounted on said bar member for movement therewith a hydraulic motor carried by said bar member drivingly connected to said wheel, conduit means connecting said cylinder to said motor valve means in said conduit means connecting said pump discharge to said cylinder, for controlling the flow of hydraulic fluid from said pump to said hydraulic cylinder, additional conduit means connecting said motor to said pump intake, there being a restricted passage for fluid in said conduit means connecting said cylinder to said fluid motor so that upon completion of extended movement of said piston said passage permitting the flow of fluid to said fluid motor for operating the same.

2. In a car parking device having a power steering system including a fluid pump having an intake and a discharge, a rear axle, and a differential housing carried by the rear axle, a boss formed integrally with said housing, a vertically disposed hydraulic cylinder carried by said boss, conduit means connecting said pump discharge to said cylinder, a piston working in said cylinder between extended and retracted positions and having a portion adjacent the lower end exteriorly of said cylinder, brake means operatively connected to said piston limiting the extended movement of said piston, a bar member carried by said piston lower end portion, an auxiliary wheel mounted on said bar member for movement therewith, a hydraulic motor carried by said bar member drivingly connected to said wheel, conduit means connecting said cylinder to said motor, valve means in said conduit means connecting said pump discharge to said cylinder, for controlling the flow of hydraulic fluid from said pump to said hydraulic cylinder, additional conduit means connecting said motor to said pump intake, there being a restricted passage for fluid in said conduit means connecting said cylinder to said fluid motor so that upon completion of extended movement of said piston said passage permitting flow of fluid to said fluid motor for operating the same, and a selector valve in said conduit means for reversing the direction of fluid flow to reverse the direction of movement of said hydraulic motor.

References Cited in the file of this patent

UNITED STATES PATENTS

| | | |
|---|---|---|
| 1,709,421 | Wiley | Apr. 16, 1929 |
| 1,890,716 | Andreasen et al. | Dec. 13, 1932 |
| 2,638,995 | Gottlieb | May 19, 1953 |
| 2,784,793 | Rando | Mar. 12, 1957 |